US012419799B1

(12) United States Patent
Gomez et al.

(10) Patent No.: US 12,419,799 B1
(45) Date of Patent: Sep. 23, 2025

(54) PRESSURE MONITORING POST USED FOR ANTERIOR HIP ARTHROPLASTY AND ARTHROSCOPY

(71) Applicant: Infinitus Medical Technologies LLC, Holly Springs, NC (US)

(72) Inventors: David J. Gomez, Holly Springs, NC (US); Nathan Winder, San Jose, CA (US); Luke Truax, Kaneohe, HI (US)

( * ) Notice: Subject to any disclaimer, the term of this patent is extended or adjusted under 35 U.S.C. 154(b) by 313 days.

(21) Appl. No.: 18/109,145

(22) Filed: Feb. 13, 2023

Related U.S. Application Data

(63) Continuation-in-part of application No. 17/083,725, filed on Oct. 29, 2020.

(60) Provisional application No. 63/309,537, filed on Feb. 12, 2022.

(51) Int. Cl.
*A61G 13/10* (2006.01)
*A61G 13/12* (2006.01)

(52) U.S. Cl.
CPC ......... *A61G 13/123* (2013.01); *A61G 13/127* (2013.01); *A61G 2203/34* (2013.01); *A61G 2210/10* (2013.01)

(58) Field of Classification Search
CPC ...... A61G 13/10; A61G 13/12; A61G 13/123; A61G 13/127; A61G 2203/30; A61G 2203/34; A61G 2210/10
See application file for complete search history.

(56) References Cited

U.S. PATENT DOCUMENTS

| | | | | |
|---|---|---|---|---|
| 8,156,941 B1 * | 4/2012 | Simms | A61G 7/1098 128/845 |
| 11,559,455 B2 * | 1/2023 | Smith | A61G 13/123 |
| 12,295,894 B2 * | 5/2025 | Diodato | A61F 5/042 |
| 2004/0133979 A1 * | 7/2004 | Newkirk | A61F 5/3761 5/624 |
| 2010/0109848 A1 * | 5/2010 | Blair | A61B 90/98 340/10.2 |
| 2013/0192609 A1 * | 8/2013 | Bellows | A61G 13/123 128/845 |

FOREIGN PATENT DOCUMENTS

CN 112089557 A * 12/2020 .............. A61G 7/05

* cited by examiner

*Primary Examiner* — Fredrick C Conley
(74) *Attorney, Agent, or Firm* — Phillips Lytle, LLP; David L. Principe

(57) ABSTRACT

The present invention provides an apparatus for sensing the pressure on the body of a patient on an anterior hip table or a standard surgical table. The pressure monitoring post provides a warning indicator when the pressure exceeds a predetermined value that is related to pressure related injuries. The pressure monitoring post may also provide for a center and two lateral pressure sensors to detect the pressure resulting on a patient's body during various processes related to hip distraction for arthroscopy and arthroplasty procedures.

21 Claims, 16 Drawing Sheets

PRESSURE MONITORING POST USED FOR ANTERIOR HIP ARTHROPLASTY AND ARTHROSCOPY

CROSS-REFERENCE TO RELATED APPLICATION

The present application claims priority benefit of U.S. Provisional Patent Application No. 63/309,537 filed on Feb. 12, 2022, entitled "Pressure Monitoring Post Used for Anterior Hip Arthroplasty and Arthroscopy" and is a continuation-in-part of U.S. patent application Ser. No. 17/083,725 filed on Oct. 29, 2020, entitled "Apparatus for Securing a Patient on an Orthopedic Surgical Table Platform," all of which are hereby incorporated by reference.

TECHNICAL FIELD

The present invention relates generally to the field of medical devices for use in the surgical theater, and more particularly to an apparatus for use in anterior hip arthroplasty and arthroscopy.

BACKGROUND ART

Orthopedic surgical technologies are rapidly evolving in their pursuit to improve outcomes, while reducing time for convalescence and rehabilitation through the use of less invasive surgical implant techniques. Over the last decade there has been a huge shift from traditional lateral hip implant insertions to anterior hip insertion of implants.

One significant change in the industry has been through the advent of advanced orthopedic surgical table platforms designed specifically for anterior hip surgical access. This includes total hip arthroplasties, hip arthroscopies, and other open reduction internal fixation techniques. This also includes platforms designed to improve pelvic orthopedic traumas. There are many manufactures of these highly specialized surgical tables, but one of the most prevalent in the United States is the HANA table available from Mizuho OSI of Union City, California.

Most hip tables require the use of a center post. This post is designed to secure and stabilize the patient's pelvis and to serve as a fulcrum when the legs are pulled (and/or slightly rotated) in order to disarticulate the joint space needed. This fulcrum distraction force is measured in either pounds or Newtons. This often foam or gel padded post also serves as a lateral stabilizing force, especially on narrow angled surgical table platforms like the Mizuho OSI® HANA® table, as well as other distal angled manufactured tables.

There has recently begun a trend toward not using this post as a primary pelvic traction anchor due to the high potential for perineal or genital tissue pressure injuries, as well as injuries to surrounding tendons, muscles, and nerves, especially the pudendal nerve.

As the legs are pulled, the patient's weight is centered on the round post, increasing the risk for pressure injury. This creates a "straddle" type pressure model of force, despite the extra padding placed. Despite the use of padding, human tissue pressure greater than 30 mmHg (or 0.6 lbs of force per square inch) can decrease capillary blood, thus increasing the risk of tissue, nerve, and vascular ischemia.

However, having a post may be desirable from a patient safety perspective, as the table is narrow and angled distally to allow for surgical access needed for joint insertion and fluoroscopy (X-ray) needed to guide implant selection and placement.

The perineal post, or "P-Post' used for anterior hip surgical procedures provides lateral stability at the area of modern anterior hip tables where the angle of the table narrows, thus allowing fluoroscopic/X-ray visualization of the tissue and pelvis without having interference from the design of the table.

The traditional method to distract the hip joint often uses the perineal post as a means of counter traction, thus creating forces where the patient's tissue and anatomy may undergo significant pressure and inertial forces as their leg is pulled distally, thus moving the body of the patient into a rigid post.

And while there have been many efforts to use padding over the post to restrict some of these inertial pressure forces, it may still create problems with anatomy due to straddle pressures.

While we know typical forces used to distract the hip joint needed for arthroscopy for example are around 89-127 lbs, these forces vary from provider to provider. There are also many factors such as the weight and size of the patient vs traction ratio, type of anesthetic (general vs regional) where maximum muscle relaxation dictates forces needed to visualize the joint space, or overcome the vacuum of the capsule until it is decompressed. These among many factors and even variance of table infrastructure is important to understand when designing a solution or process that best mitigates known injury risks from applying excess direct force and pressure to the patient in areas directly outside the hip joint.

The problem with current post pressure relieving methodologies is that they all basically require a fixed round foam or gel overlay. The main problem with this design, is that the "straddle effect" does not allow any room for the genitalia of male of females. And while light Trendelenburg positioning can be combined with some friction using foam or gel tops (only when dry) via a "post free" option, there is too much variance of end user processes for this to work.

When the body of the patient is pulled distally at the legs for traction, the body can also shift contra-laterally, thus impacting visualization in the field both visually and via x-ray/fluoroscopy. This issue may be accentuated when there is a loss of the post's lateral support on a narrow table. If the patient is again, pulled distally, the genitalia may be moved into a rounded foam post overlay, that may still create excess pressure (32 mmHG or 0.621 lbs psi) that causes the start of ischemic processes. Any additional pressure beyond the 32 mm Hg threshold can also create stretching or compression of the pudendal nerves, which are also rare but common enough injuries in patients undergoing anterior hip procedures.

Accordingly, there is a need for an improved system for use in connection with anterior hip arthroplasty and arthroscopy procedures on an orthopedic surgical table platform.

SUMMARY OF THE INVENTION

The present invention meets the above described need by providing a post relative pressure monitoring system via mechanical, liquid, semi-liquid, material or electrical means to measure and monitor pressure applied directly to the post itself by the anatomy of the patient. This relative pressure measurement in the post/post cover assembly, post overlay or external device is used to measure the pressure applied to the patient to reduce risk of injury to the patient. This pressure monitoring can be located in the post/post cover assembly, post overlay and/or external device used between the patient and the post/post cover assembly and/or post overlay, with the overlay as disclosed in pending application U.S. patent application Ser. No. 17/083,725, entitled "Apparatus for Securing a Patient on an Orthopedic Surgical Table Platform," which is incorporated herein by reference. By using principles such as, but not limited to, simple fluid mechanics, mechanical linkages utilizing controlled spring forces and/or native material properties, material displacement, pressure indicating dyes, material color changing, etc. or some other mechanical means, electrical sensing utilizing pressure sensing technologies such as button switches, piezo indicators, accelerometers, electrical measuring of mechanical displacement, etc. relative pressure applied between the patient and ultimately any combination of post assembly, post overlay and/or external device can be measured. This relative pressure may be used by the surgical team personnel to monitor and ultimately alarm the team of potential risks in sustaining too high a pressure for safety or for alarming very high short duration excess pressure applied to the patient which may cause ischemic issues, nerve palsy or damage to the genitals. The present invention provides a means to indicate applied relative pressure from no pressure at all to indicating a safety alert when sustained pressure above safe limits level is reached.

Still another embodiment on the post might have a center and two lateral pressure sensors for measuring forces secondary to the inertial forces due to single leg traction of right vs left. This configuration allows for relative pressure safety monitoring from applied hip distraction force and/or the relative pressure applied to the patient by the post when the patient is experiencing lateral forces due to gravity, contact with surgical team members, etc.

The post overlay design fits over the standard perineal post on any anterior hip table in the industry. It may be made for posts with an external diameter of 2-6 inches. The design is unique to the procedure use and utility of the post.

The foam overlay fits over and secures the distal end of the pad and table to stabilize the patient. The post also provides a fulcrum of stability and resistance during hip joint distractions of 80-300 lbs. of force, as the legs are manually or mechanically pulled via leg accessory traction devices. These posts are typically round.

When the legs are pulled, two forces are generated. Once force moves the patient into the post. This force is where post stability provides a mechanical fulcrum needed to distract the hip joint. When the leg is pulled, the other leg is usually fixed into place, but in some systems this configuration may not provide enough retraction to overcome the contralateral shifting, of weight or the patient, towards the side being pulled. This result can impact X-ray and fluoroscopy needed to identify the distraction. In essence, instability creates a moving target of a few inches. This instability can force movement of the X-ray repetitively during the procedure.

The underlying pneumatic (PNEUMAFOM®) friction pad will also greatly reduces the amount of overall force and inertia into the underlying post.

The lower edge of the post overlay design of the present invention may be elongated to restrict the patient's movement at the surface of the pad. As it rises, it further restricts forward movement into the post. The concave cuts are designed to accommodate and restrict the amount of pressure against the patient's perineal and genital tissue. Typical round post foam pads do not make space for the genitals.

DESCRIPTION OF THE PREFERRED EMBODIMENTS

Figure 1:
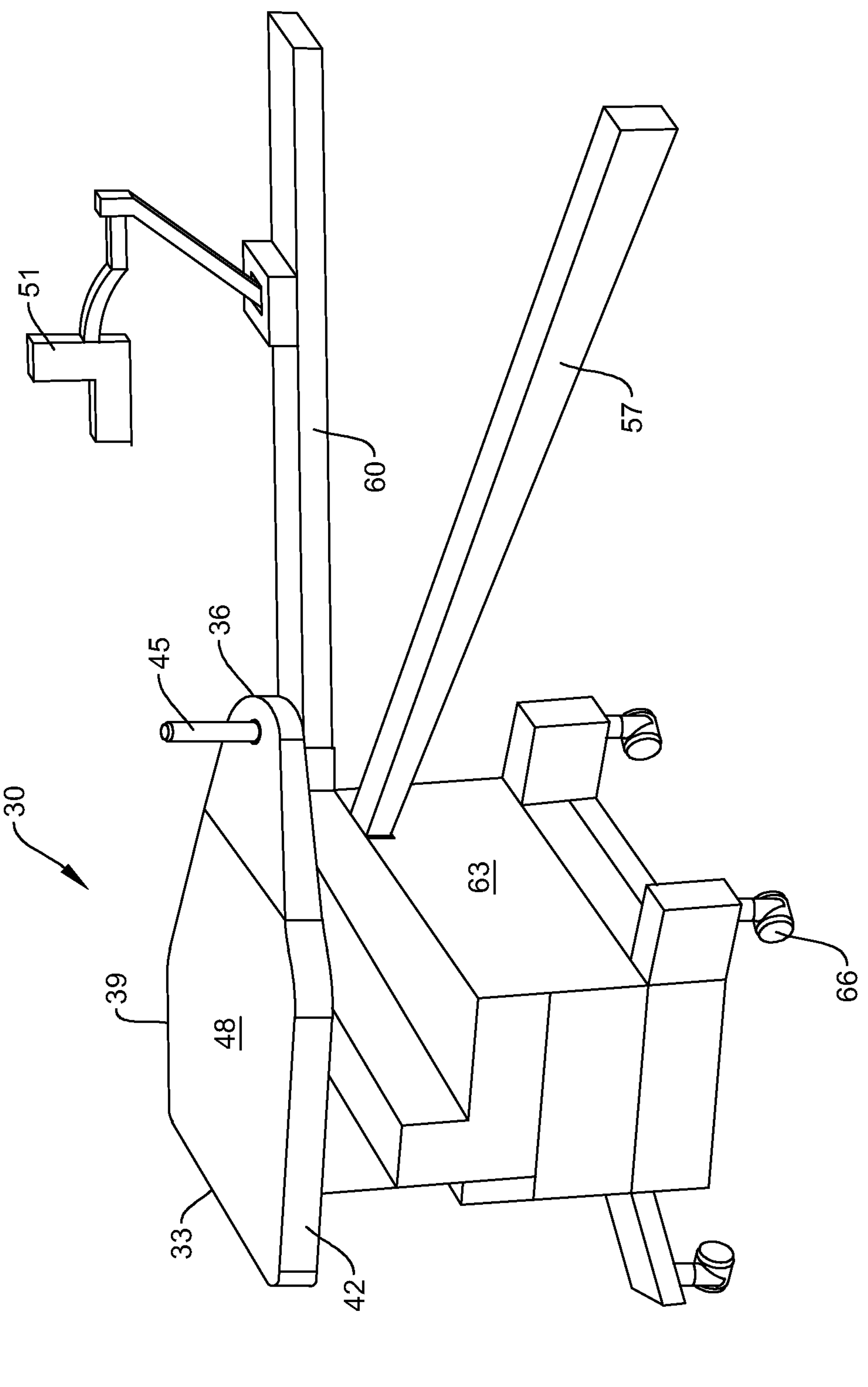
FIG. 1 is a perspective view of an orthopedic surgical table platform designed specifically for anterior hip surgical access.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring to FIGS. 1-8 generally, and initially to FIG. 1, an orthopedic surgical table platform 30 such as the HANA brand table available from Mizuho OSI of Union City, California, has a first end 33 and a second end 36 disposed opposite from the first end 33. The platform 30 is wider at the first end 33 and gradually narrows inward from opposed sides 39, 42 until it reaches the second end 36. A cylindrical post 45 may be disposed in spaced apart relation from the second end 36. The post 45 may extend for a relatively short distance above a top surface 48 of the surgical table platform. The top surface 48 may be planar as shown. In use, a patient may be supported on the top surface 48 such that the torso extends downward and each leg of the patient may be disposed on opposite sides of the post 45. The legs of the patient may extend to foot support 51 that may be supported by elongate members 57 and 60 extending from the base 63. A foot support 51 may be adjustably mounted on both elongate members 57, 60 as shown in connection with member 60 in the drawing. The base 63 supports the elongate members 57 and 60 and provides for adjustment of the elongate members 57, 60 in multiple planes. The base 63 also supports the platform 30 and top surface 48. The base 63 may also be provided with casters 66.

Figure 2:
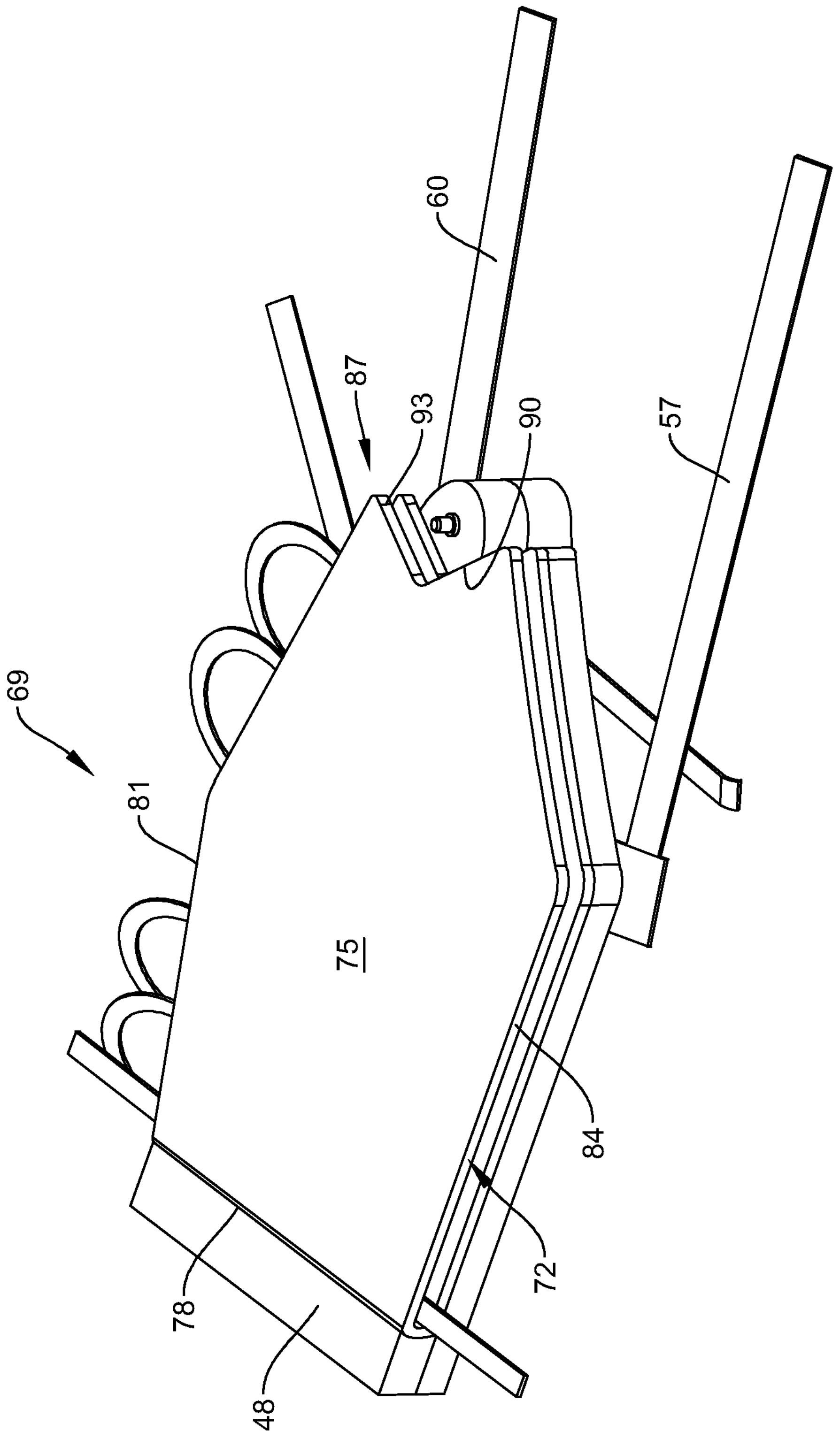
FIG. 2 is a perspective view of a pad assembly disposed on the upper surface of an orthopedic surgical table platform.

Turning to FIG. 2, a pad assembly 69 of the present invention may be supported on the top surface 48. The pad assembly 69 has a foam top 72 with a planar surface 75 that supports a patient undergoing a procedure on the platform 30. As shown the foam top 72 has a shape that conforms to the shape of the top surface 48 with a bottom portion 78, opposed side portions 81, 84, and a top portion 87. The top portion 87 is formed by two inward angled sections 90 and 93 that provide for a truncated top portion 87 that provides room for the post 45 (FIG. 1). The pad assembly 69 is described in greater detail herein.

Figure 3:
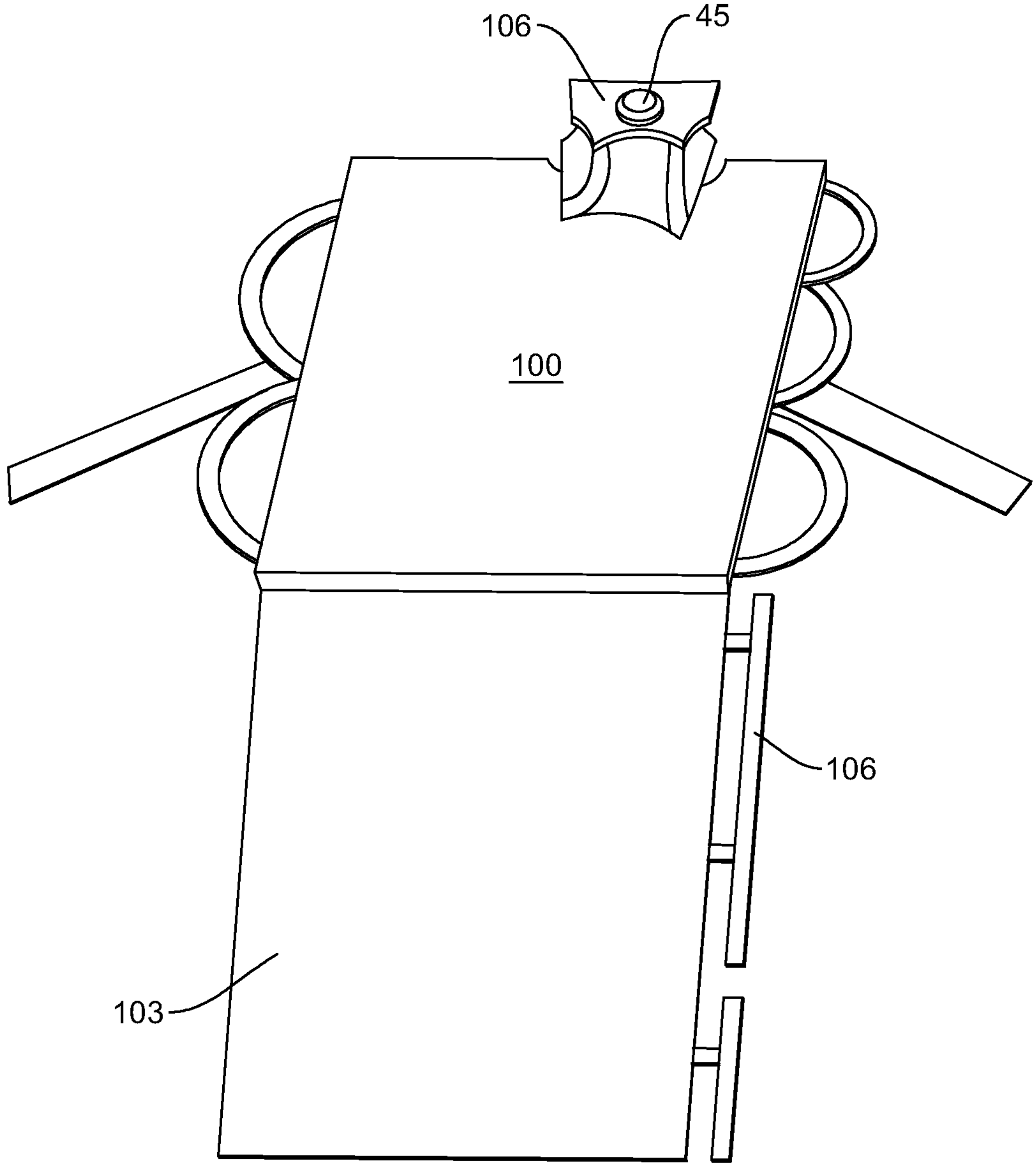
FIG. 3 is a perspective view of a pad assembly and a post overlay on a standard surgical table.

In FIG. 3, an alternate embodiment of the pad assembly 69 is shown. Pad assembly 100 may be mounted on a standard rectangular shaped surgical table 103. A standard bed rail 106 extends from the side of the table 103. A post 45 and post overlay 106 are shown at one end of the table 103. The components of the pad assembly 100 and post overlay 106 are described in greater detail herein.

Figure 4:
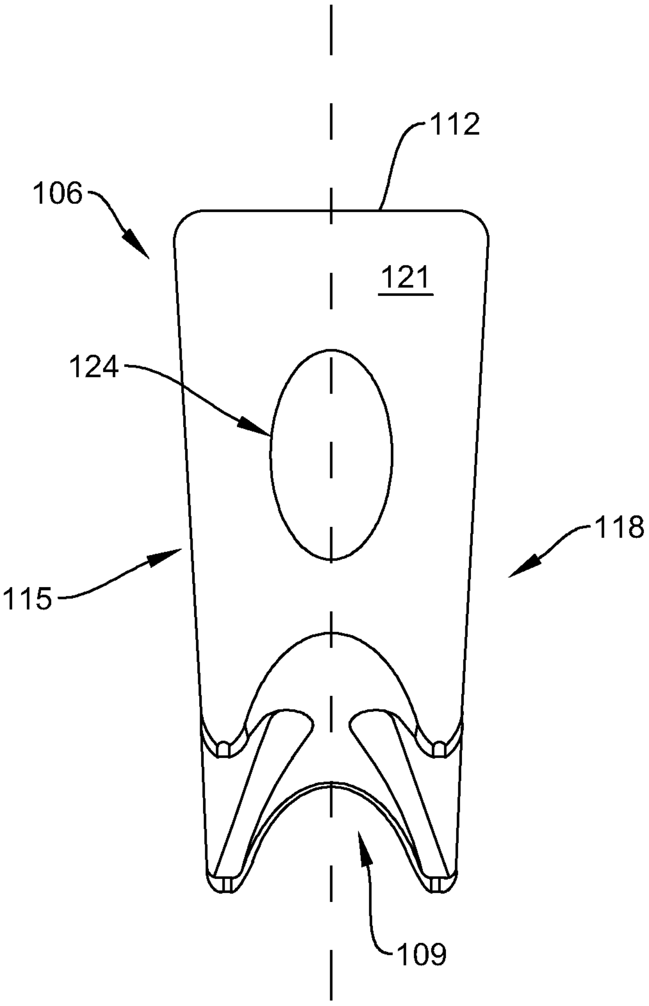
FIG. 4 is a top perspective view of a post overlay of the present invention.

Turning to FIG. 4, the post overlay 106 may be constructed of a resilient, flexible material that provides cushioning to prevent injuries when the body of the patient contacts the post 45 during a medical procedure. The foam may comprise a polyurethane foam having 1.8-6 lb density with a 24-45 ILD (indentation load deflection) range. Other flexible foam materials may also be suitable. The post overlay 106 has a front wall 109, a rear wall 112, and opposed side walls 115, 118. The post overlay 106 has a central body portion 121 with an opening 124 defined therein. The opening 124 has an inside diameter sized to mate with the outside diameter of the post 45. Other shapes for the opening 124 and the post 45 may also be suitable as will be evident to those of ordinary skill in the art based on this disclosure.

Figure 5:
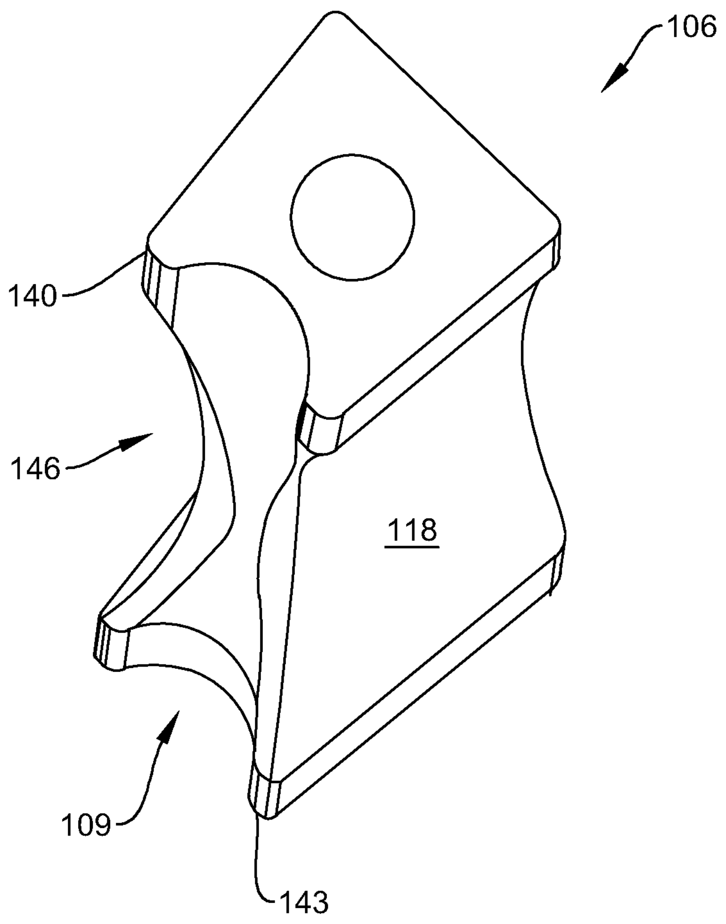
FIG. 5 is a perspective view of the post overlay of FIG. 4.

In FIG. 5, the side wall 118 is concave. The side wall 115 on the side opposite from side wall 118 is also concave. The front wall 109 is also concave. The front wall 109 is widest as the top 140 and the bottom 143 and is narrower in a mid-portion 146. Accordingly, the front wall 109 has an "hourglass" shape with inward curves at the top and bottom and in the middle.

Figure 6:
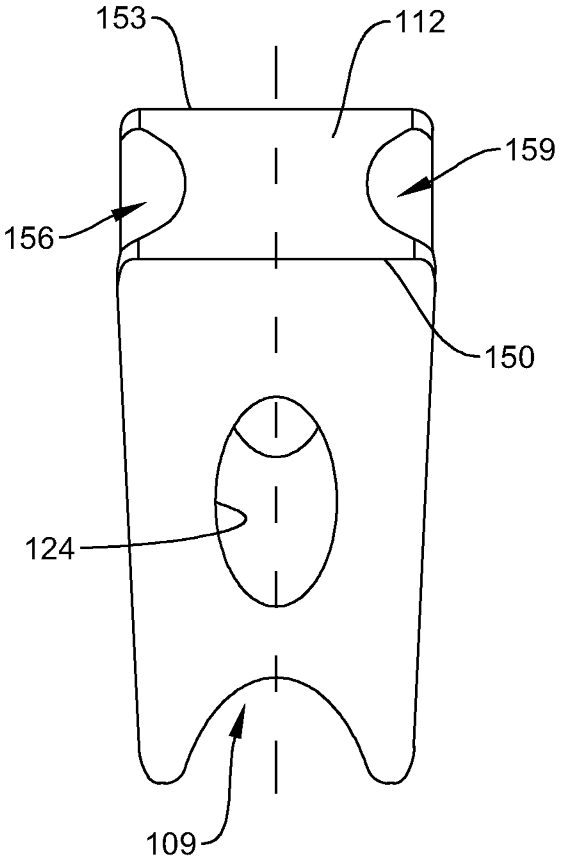
FIG. 6 is a top perspective view of the post overlay of FIG. 4.

Turning to FIG. 6, the rear wall 112 may be substantially flat and is straight at the top edge 150 and bottom edge 153. The sides 156, 159 of the rear wall 112 are curved inward. The opening 124 for the post 45 extends from the top surface through the entire height of the post overlay 106. The front wall 109 is concave.

Figure 7:
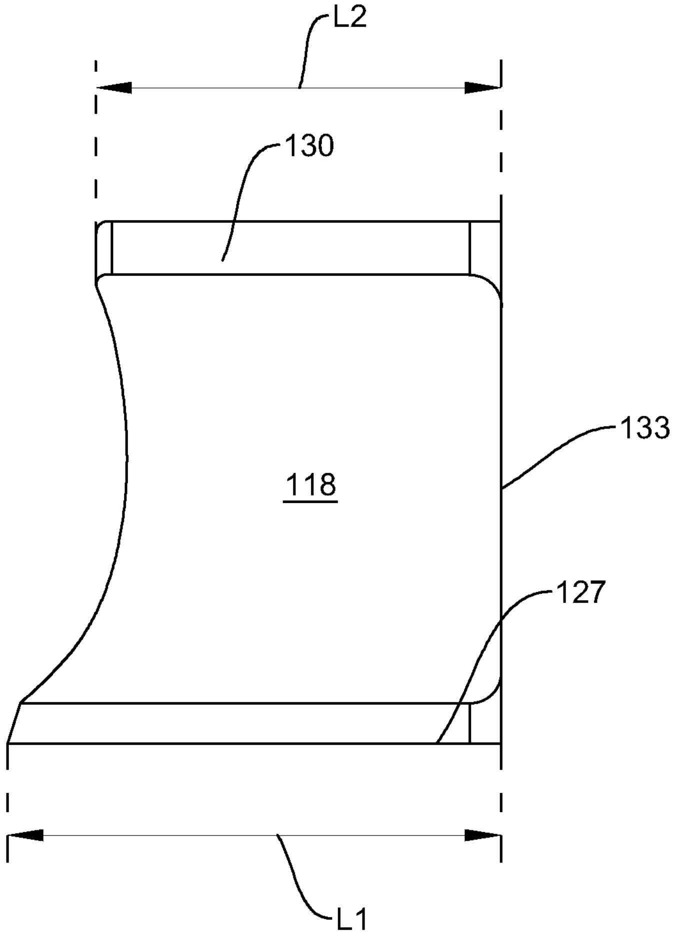
FIG. 7 is a side elevational view of the post overlay of FIG. 4.

In FIG. 7, the side wall 118 is shown in greater detail. At the bottom edge 127, the side wall 118 has a length L1 that is greater than the length L2 of the top edge 130. The rear 133 of the side wall 118 is substantially vertical and is oriented at approximately ninety degrees with respect to the top and bottom edges 130, 127 of the side wall 118. The front of the side wall 118 curves from the bottom edge 127 to the top edge 130.

Figure 8:
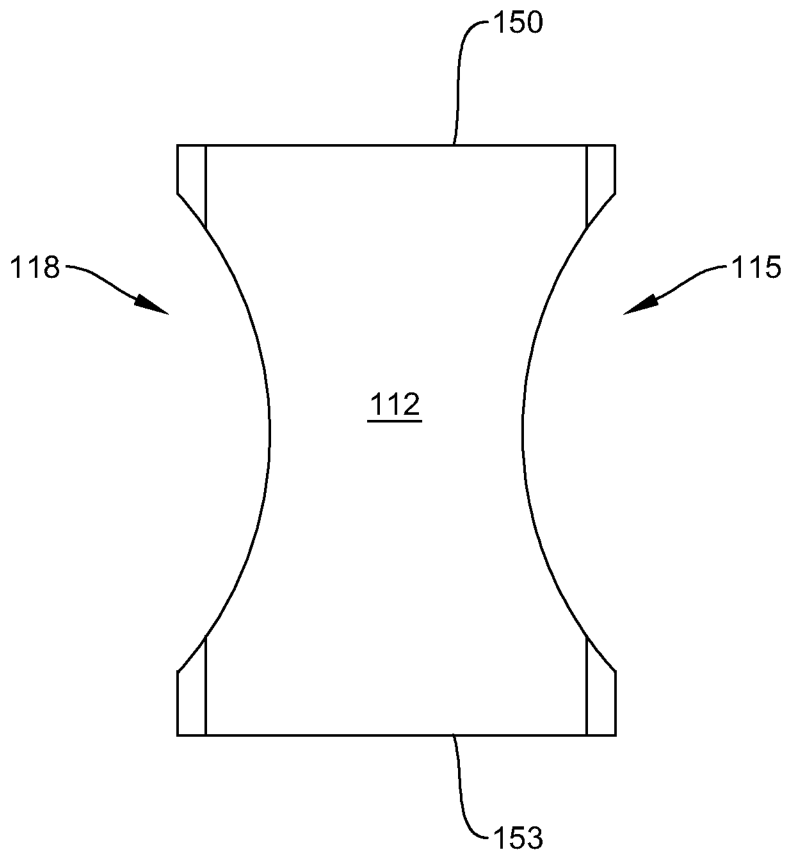
FIG. 8 is a rear elevational view of the post overlay of FIG. 4.

In FIG. 8, the rear wall 112 is best shown. The side walls 115, 118 curve inward from the top edges to the bottom edges along an arc.

The design of the post overlay 106 provides space to accommodate the genital area thereby reducing the overall pressure into the post 45 as it relates to genital tissue. The lateral concave surfaces of the side walls 115, 118 accommodate the legs when adducted, or during any crossover movements required to help with joint distraction. The ILD and makeup of the foam pad 72 provides the necessary force deflection to minimize tissue pressure while absorbing inertial forces into foam instead of the post 45 in contrast to typical round overlays. When combined with the underlying movable friction foam pad option, the overall inertia into the post 45 is greatly reduced over standard reliance on either post overlay or foam pad alone.

Figure 9:
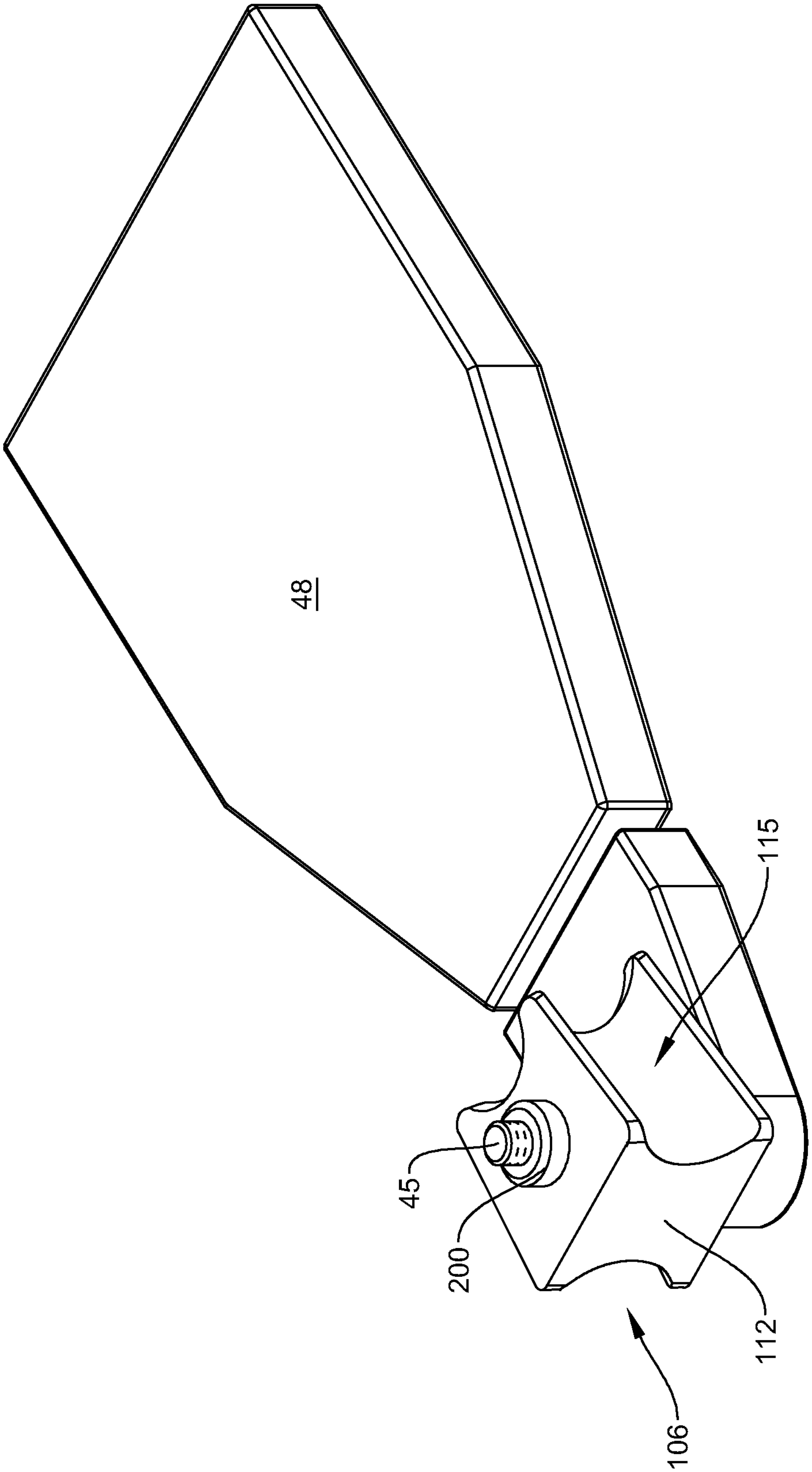
FIG. 9 is a perspective view of one embodiment of the pressure monitoring post and post overlay of the present invention.
Figure 10:
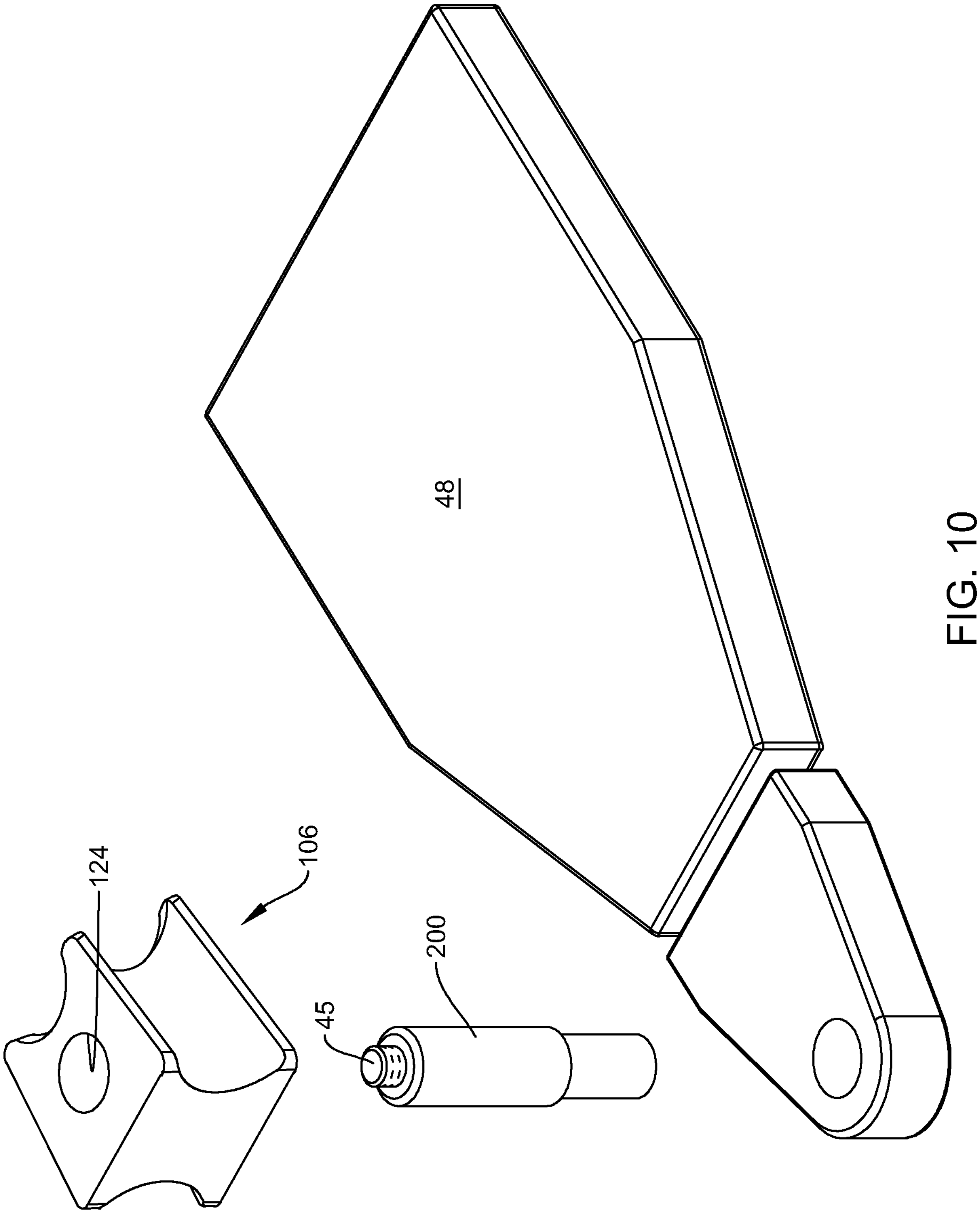
FIG. 10 is an exploded perspective view of the apparatus shown in FIG. 9.

Turning to FIGS. 9-21 generally and initially to FIGS. 9-10, a sensor 200 may be disposed between the post 45 and the post overlay 106. As described above, the post overlay 106 has a shape designed to reduce the possibility of injury to the genital area of a patient straddling the post 45. The sensor 200 may be provided with a warning indicator 203 that may extend upward along the outside of the post 45. The warning indicator 203 may be actuated when the sensor 200 reads a pressure that exceeds a predetermined level. As discussed above there are specific levels above which pressure related injuries may occur (i.e., 32 mm Hg or 0.621 psi).

Figure 11:
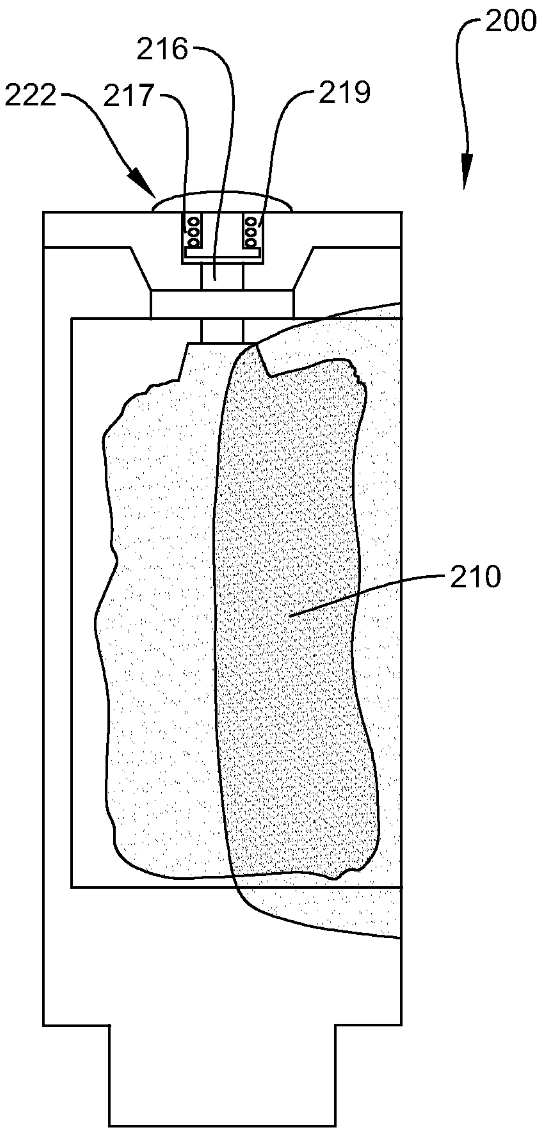
FIG. 11 is a cutaway elevational view of one embodiment of the sensor.

Turning to FIGS. 11-14, and initially to FIG. 11, in one embodiment the sensor 200 may comprise a membrane 210. When pressure is applied to the membrane 213, a piston 216 drives a small amount of fluid into a chamber 217 with a spring 219 biased warning indicator 222.

Figure 12:
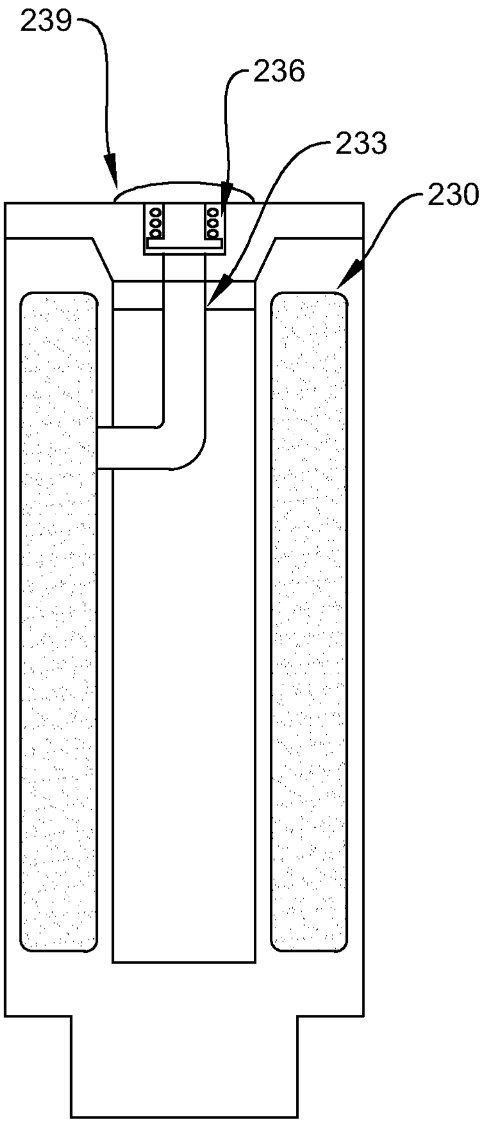
FIG. 12 is a cutaway elevational view of another embodiment of the sensor.

In FIG. 12, a bladder 230 may hold a fluid. When pressure is applied to the outside surface of the bladder 230, the fluid passes through tube 233 and provides a force against spring 236. The upward force against the spring 236 causes the warning indicator 239 to elevate providing a visual indication that the pressure of the patient on the post 45 has exceeded a predetermined value.

Figure 13:
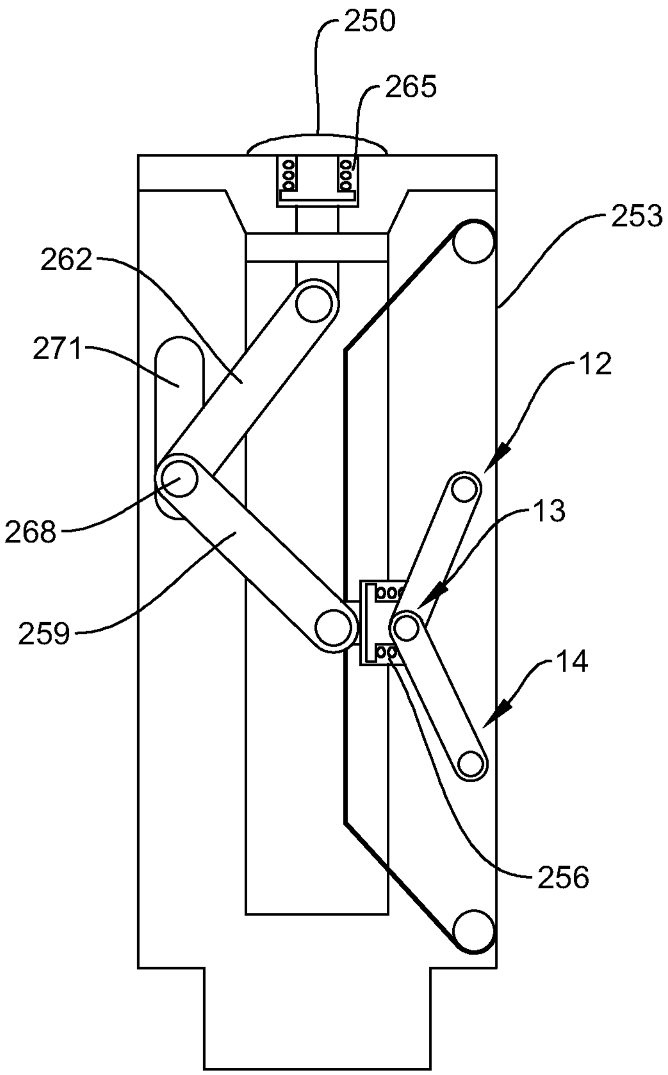
FIG. 13 is a cutaway elevational view of another embodiment of the sensor.

In FIG. 13 a mechanical linkage provides for actuating a warning indicator 250. When pressure above a certain predetermined level is exerted against surface 253, the pressure overcomes the force of a spring 256 to cause a linkage to transmit a force sufficient to move the warning indicator 250 from a spring biased normally closed position to an open position. The first link 259 is connected to a second link 262 and is configured to cause one of the ends of the second link 262 to move upward against the force of a spring 265. The first and second links 259, 262 are connected by a pin 268 that is captured by and travels in a slot 271. When the pressure acting on surface 253 exceeds a predetermined level, the linkage overcomes the force of springs 256 and 265 to actuate the warning indicator 250.

Figure 14:
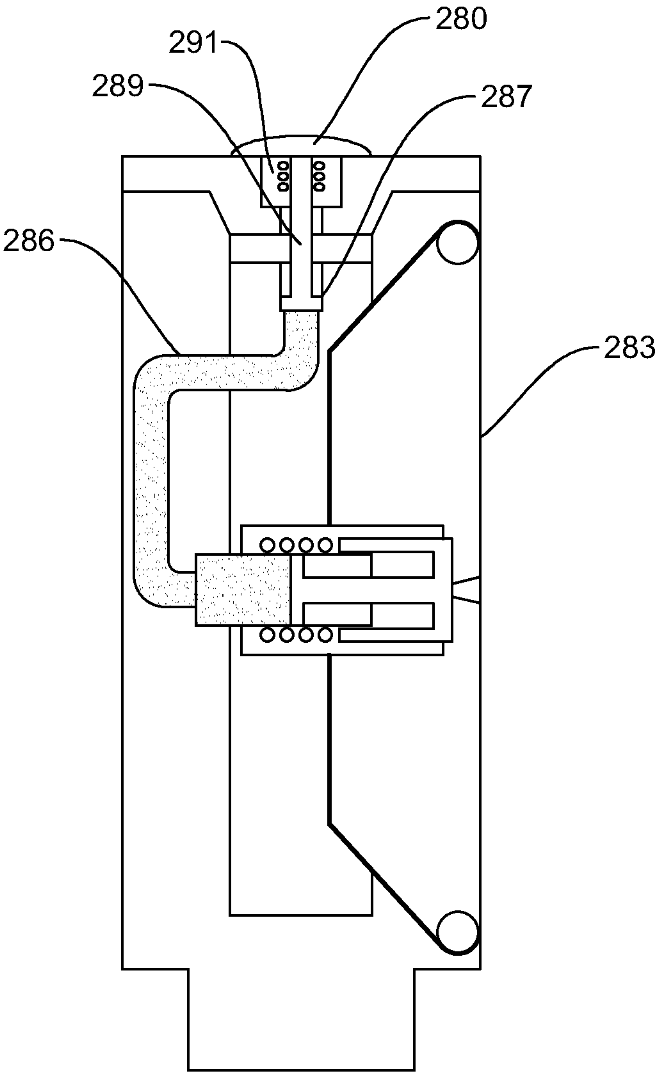
FIG. 14 is a cutaway elevational view of another embodiment of the sensor.

FIG. 14 discloses a hydraulically actuated warning indicator 280. When pressure acts on surface 283 a plunger pushes a fluid through a tube 286. The opposite end of the tube 286 is in fluid communication with a plunger surface 287. The plunger 289 is spring 291 biased in the downward direction. The fluid presses against the plunger 289 to overcome the force of spring 291 to actuate the warning indicator 280.

Figure 15:
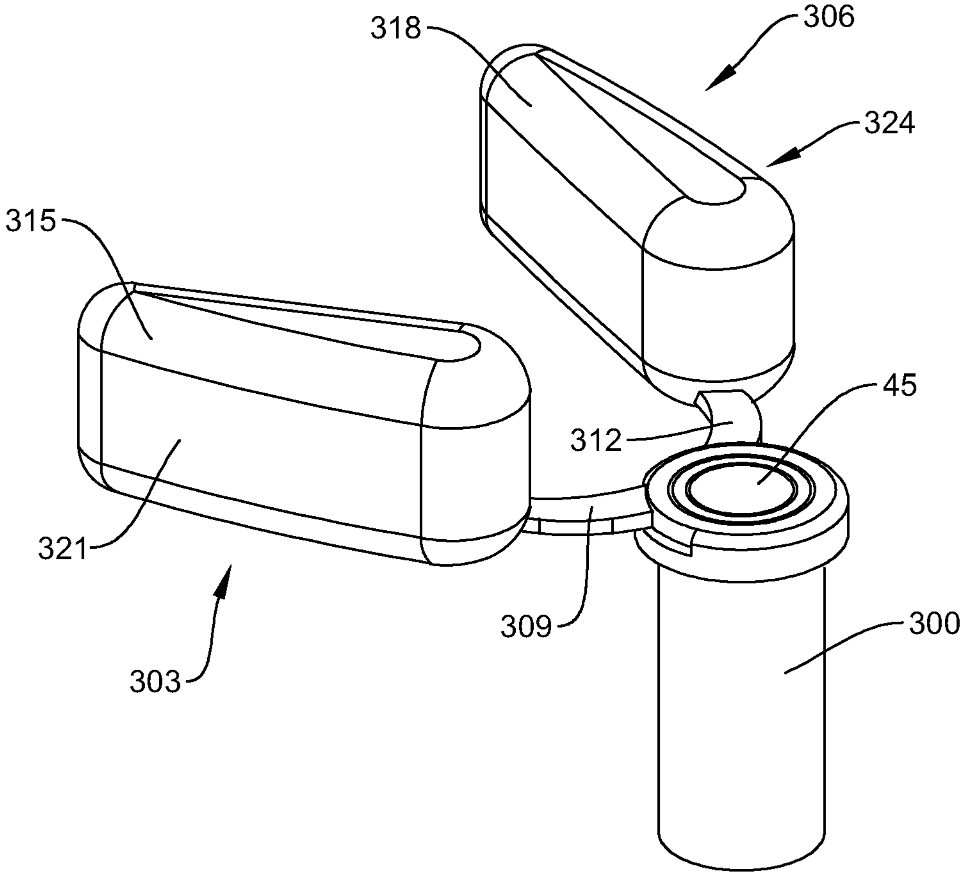
FIG. 15 is a perspective view of an alternate embodiment that includes a center and two lateral sensors.
Figure 16:
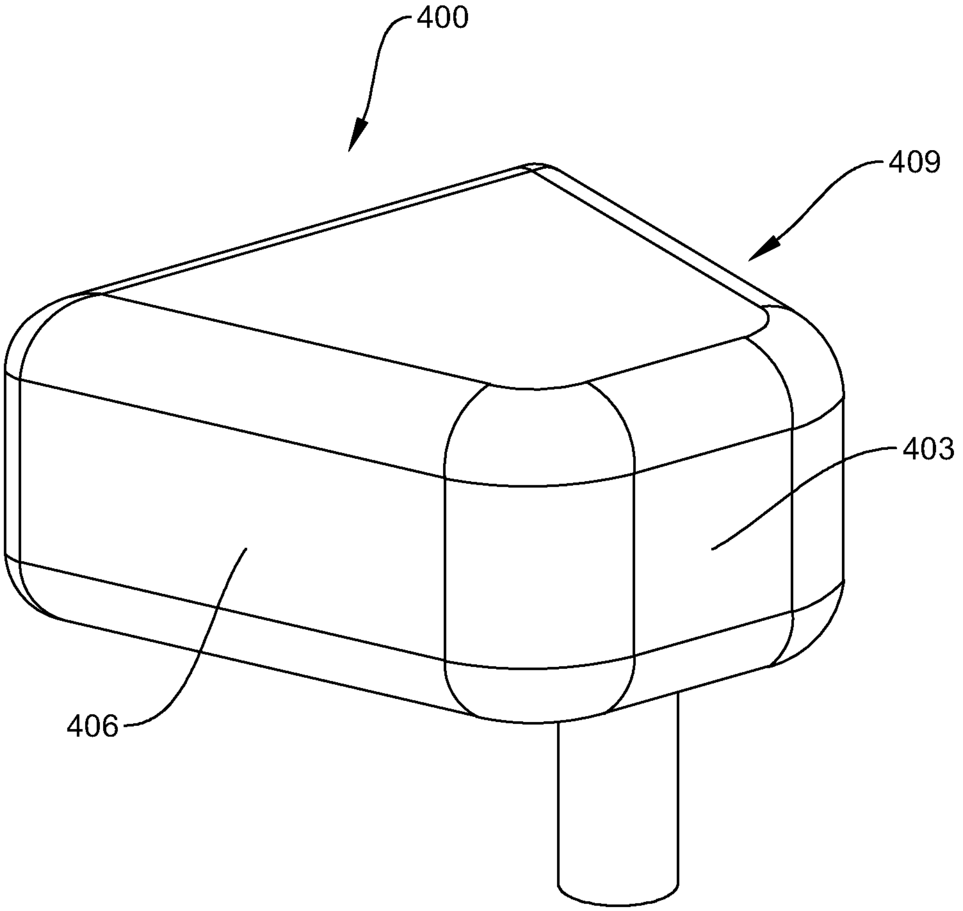
FIG. 16 is a perspective view of a saddle shaped post overlay containing a center and two lateral sensors.

Turning to FIG. 15, an alternate embodiment of the sensor assembly of the present invention provides a center 300 and two lateral pressure sensors 303 and 306 for measuring pressures secondary to the inertial pressures due to single leg traction of right vs left. This configuration allows for relative pressure safety monitoring from applied hip distraction force and/or the relative pressure applied to the patient by the post when the patient is experiencing lateral forces due to gravity, contact with surgical team members, etc.

The central pressure sensor 300 may be disposed on or around the post 45. The lateral pressure sensors 303 and 306 may be pivotally attached to the post 45 by a pair of arms 309 and 312. The arms 309 may comprise elongate link shaped members pivotally connected to rotate in opposite directions about the post 45. The arms 309 and 312 may support a pair of elongate curved members 315, 318 having outer surfaces 321, 324 ergonomically designed to engage with the inner thighs of the patient.

Turning to FIG. 21, in an alternate embodiment, the center and lateral pressure sensors are contained within a saddle shaped enclosure 400. The center pressure sensor measure pressure against the front surface 403 of the enclosure 400, and the lateral pressure sensors measure the pressure against the angled outer surfaces 406 and 409.

The present invention provides a modular friction pad assembly that may be paired with an optional post overlay designed to restrict movement incrementally from pad to skin surface of the lower buttocks, while accommodating genital anatomic structures via a concave and non-rounded design that is gradually accentuated from top to bottom. This post overlay design reduces the overall force and inertia into the underlying post and accounts for genital, vascular, and nerve anatomy, and the special physics involved during hip joint distraction via manual or mechanical pulling of the legs.

The present invention provides an optional post overlay design that is concave and slanted from top down towards patient's perineum needed to restrict mechanical and tissue force into the genitals, underlying nerves, and surrounding tissue.

The present invention provides an optional post overlay with lateral concave design needed to support the legs during crossover distraction methods, thereby minimizing force into the underlying post from a lateral perspective against the thighs. The foam is a polyurethane foam of 1.8 lb-6 lb density with 24-45 ILD range. The post overlay may be paired with a modular friction pad assembly.

The present invention provides an optional post overlay that when combined with a modular foam friction pad assembly, reduces the overall forces into a perineal post by more than either the overlay or pad assembly alone, especially when using distraction pressures higher than 150 lbs. of force, or when pulling lower extremities (distraction) on thin adults that may have more contralateral movements during distraction due to their weight and center of gravity changes. The combined lateral stability of the pad assembly and overlay may also reduce falls in high BMI patients on narrow angled hip tables in comparison to either product alone.

The pad assembly of the present invention provides some friction resistance needed to disarticulate the joint and to reduce the amount of "straddling pressure" into a round post. If the post is still required to be used, the resistance decreases the amount of bodily inertia against the post, as the rest of the body's skin to friction contact on the underlying material holds traction and resists distal movement, thus minimizing perineal force movement into the post as the feet and legs are pulled.

The present invention may provide a hybrid approach to include a post. As it may be unclear how much force is required for disarticulation, and the fact that there is no standard agreed or accepted amount of force in the industry, the post may serve as a minimal fulcrum force for distraction, or more importantly lateral stabilization.

Therefore, while the presently-preferred form of the pressure monitoring post has been shown and described, and several modifications and alternatives discussed, persons skilled in this art will readily appreciate that various additional changes and modifications may be made without departing from the spirit of the invention, as defined and differentiated by the following claims.

The invention claimed is:

1. An orthopedic surgical table, comprising:

a table having a first end, a second end, and a support surface;

a post disposed on the table and extending from the support surface near the second end;

a post overlay configured to surround at least a portion of the post;

a sensor configured to measure a pressure exerted against the post; and, wherein the post overlay further comprises a body bordered at least in part by a front wall, the body having a bore defined therein configured to receive the post, the front wall having a concave surface configured to provide space to accommodate a genital area of a patient to reduce the overall pressure into the post as it relates to genital tissue of the patient during hip distraction.

2. The table of claim 1, wherein the sensor is mounted on the post.

3. The table of claim 1, wherein the sensor is mounted between the post overlay and the post.

4. The table of claim 1, wherein the sensor is mounted on the outside of the post overlay.

5. The table of claim 1, further comprising a pair of laterally extending members supported from the post, the laterally extending members having pressure sensors disposed thereon.

6. The table of claim 5, wherein the laterally extending members are pivotally connected to the post.

7. The table of claim 6, wherein the laterally extending members are spring biased in an open angularly spaced apart relation.

8. The table of claim 1, wherein the first end of the table has a width greater than the second end of the table.

9. The table of claim 1, wherein the sensor is selected from the group consisting of electric, mechanical, and hydraulic sensors.

10. The table of claim 1, wherein the post overlay is round.

11. The table of claim 1, further comprising a warning indicator configured to provide an alert when the pressure measured by the sensor exceeds a predetermined value.

12. The table of claim 11, wherein the warning indicator provides an indication selected from the group of visual and audible.

13. The table of claim 11, wherein the warning indicator is configured to extend vertically relative to the top of the post.

14. The table of claim 1, further wherein the post overlay is configured to contact the inner thigh of the patient, the sensor comprises a center and two lateral pressure sensors disposed on the post overlay.

15. The table of claim 14, wherein the post overlay is comprised of soft membrane materials such as foam, fluid bladders, TPEs, silicones, or other compliant materials that allow for greater surface area interference with the anatomy of a patient.

16. An orthopedic surgical table, comprising:
- a table having a first end, a second end, and a support surface;
- a post disposed on the table and extending from the support surface near the second end;
- a post overlay configured to surround at least a portion of the post;
- a sensor configured to measure a pressure exerted against the post;
- further comprising a warning indicator configured to provide an alert when the pressure measured by the sensor exceeds a predetermined value;
- wherein the warning indicator is configured to extend vertically relative to the top of the post; and, wherein the warning indicator is spring biased in a normally closed position.

17. The table of claim 16, wherein the warning indicator is mechanically actuated by a linkage.

18. The table of claim 16, wherein the warning indicator is hydraulically actuated.

19. An orthopedic surgical table, comprising:
- a table having a first end, a second end, and a support surface;
- a post disposed on the table and extending from the support surface near the second end;
- a post overlay configured to surround at least a portion of the post;
- a sensor configured to measure a pressure exerted against the post;
- further comprising a warning indicator configured to provide an alert when the pressure measured by the sensor exceeds a predetermined value; and, wherein the post has a soft membrane configured such that, when pressure is applied to the membrane, an internal piston drives a small amount of fluid through a tube to activate the warning indicator.

20. An orthopedic surgical table, comprising:
- a table having a first end, a second end, and a support surface;
- a post disposed on the table and extending from the support surface near the second end;
- a post overlay configured to surround at least a portion of the post;
- a sensor configured to measure a pressure exerted against the post;
- further comprising a warning indicator configured to provide an alert when the pressure measured by the sensor exceeds a predetermined value; and, further comprising panels on the post where a direct linkage to the panels on the post can be depressed by the application of pressure in combination with a force limiting spring configured to drive the warning indicator to show the amount of pressure being applied to the post.

21. An orthopedic surgical table, comprising:
- a table having a first end, a second end, and a support surface;
- a post disposed on the table and extending from the support surface near the second end;
- a post overlay configured to surround at least a portion of the post;
- a sensor configured to measure a pressure exerted against the post;
- wherein the post overlay further comprises a body bordered at least in part by a front wall, and a pair of side walls, the body having a bore defined therein configured to receive the post; the side walls having a concave surface; and,
- the front wall having a concave surface.

* * * * *